United States Patent
Herrmann et al.

(10) Patent No.: US 10,118,464 B2
(45) Date of Patent: Nov. 6, 2018

(54) OFF-ROAD UTILITY VEHICLE AIR CONDITIONING SYSTEM

(71) Applicant: Deere & Company, Moline, IL (US)

(72) Inventors: Chad M. Herrmann, Horicon, WI (US); Larry D. Swanson, Horicon, WI (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/280,189

(22) Filed: Sep. 29, 2016

(65) Prior Publication Data

US 2018/0086180 A1 Mar. 29, 2018

(51) Int. Cl.
| | |
|---|---|
| *B60H 1/32* | (2006.01) |
| *B60H 1/00* | (2006.01) |
| *B60K 5/04* | (2006.01) |
| *B60K 17/06* | (2006.01) |
| *B60K 17/08* | (2006.01) |

(52) U.S. Cl.
CPC ......... *B60H 1/3208* (2013.01); *B60H 1/0045* (2013.01); *B60H 1/3222* (2013.01); *B60H 1/3229* (2013.01); *B60K 5/04* (2013.01); *B60K 17/06* (2013.01); *B60K 17/08* (2013.01); *B60Y 2400/72* (2013.01)

(58) Field of Classification Search
CPC .. B60H 1/3208; B60H 1/0045; B60H 1/3229; B60K 17/06; B60K 5/04; B60Y 2400/72
See application file for complete search history.

(56) References Cited

U.S. PATENT DOCUMENTS

| | | |
|---|---|---|
| 3,365,906 A | 1/1968 | Zadig |
| 3,983,715 A | 10/1976 | Hair, Jr. et al. |
| 4,050,263 A | 9/1977 | Adalbert et al. |
| 4,800,730 A | 1/1989 | Hipfl et al. |
| 4,862,700 A | 9/1989 | Suzuki |
| 4,894,999 A | 1/1990 | Kaiju et al. |
| 5,063,829 A | 11/1991 | Takao et al. |
| 6,393,849 B1 | 5/2002 | Takenaka et al. |
| 7,021,074 B2 | 4/2006 | Hara et al. |
| 7,913,505 B2 * | 3/2011 | Nakamura ......... B60H 1/00378 180/68.1 |
| 8,801,086 B2 | 8/2014 | Obe et al. |

(Continued)

OTHER PUBLICATIONS

Ranger Crew XP 1000 EPS. Product overview [online]. Polaris, 2016 [retrieved on Sep. 29, 2016]. Retrieved from the Internet:< URL:http://www.polaris.com/en-us/ranger-utv/ranger-crew-xp-1000-eps-northstar-hvac-edition>.

(Continued)

*Primary Examiner* — Emmanuel Duke

(57) ABSTRACT

An off-road utility vehicle air conditioning system includes an air conditioning unit positioned at least partially inside a mounting structure in front of an enclosed cab, and between a pair of front wheels of the utility vehicle. The air conditioning unit may be connected to a variable displacement air conditioning compressor positioned behind the cab and below a rear cargo box. A non-electronically controlled belt driven continuously variable transmission transmits power from a gas powered internal combustion engine under the rear cargo box to a pair of front wheels and pair of rear wheels, the continuously variable transmission biased to ratios where the engine runs at over about 5000 rpm.

11 Claims, 5 Drawing Sheets

(56) References Cited

U.S. PATENT DOCUMENTS

| | | |
|---|---|---|
| 8,973,693 B2 | 3/2015 | Kinsman et al. |
| 9,738,134 B1* | 8/2017 | Rittenour ............. B60H 1/0045 |
| 2006/0107920 A1* | 5/2006 | Serkh ...................... F02B 63/04 |
| | | 123/198 R |
| 2008/0229767 A1 | 9/2008 | Nakamura et al. |
| 2014/0065936 A1 | 3/2014 | Smith et al. |
| 2014/0124279 A1 | 5/2014 | Schlangen et al. |
| 2015/0047917 A1* | 2/2015 | Burt, II ............. B62D 25/2036 |
| | | 180/292 |
| 2015/0343900 A1* | 12/2015 | Schlangen ............... B60G 3/20 |
| | | 180/247 |

OTHER PUBLICATIONS

Ranger XP 1000 EPS. Product overview [online]. Polaris, 2016 [retrieved on Sep. 29, 2016]. Retrieved from the Internet:< URL: http://www.polaris.com/en-us/ranger-utv/ranger-xp-1000-eps-northstar-hvac-edition>.

2017 Ranger XP 1000 / Ranger Crew 1000 XP Owner's Manual, Polaris, 2016 [retrieved on Sep. 29, 2016]. Retrieved from the Internet:< http://cdn.polarisindustries.com/polaris/common/parts-manuals/9927174r03_lo_res.pdf>.

* cited by examiner

OFF-ROAD UTILITY VEHICLE AIR CONDITIONING SYSTEM

FIELD OF THE INVENTION

This invention relates to off-road utility vehicle air conditioning systems, and more specifically to air conditioning systems for off-road utility vehicles having gas engines and non-electronically controlled continuously variable transmissions.

BACKGROUND OF THE INVENTION

Off-road utility vehicles with gas engines and non-electronically controlled continuously variable transmissions run at high engine speeds, typically from about 5000 rpm to about 6500 rpm for peak power. These utility vehicles run at low idle when the CVT is disengaged, typically below about 1000 engine rpm. In the past, air conditioning systems that could provide adequate cooling for off-road utility vehicles at engine low idle, would require excess power and have excess cooling capacity at high engine speeds over about 5000 rpm. As a result, utility vehicle performance (speed, acceleration and fuel economy) would be reduced. Additionally, excess liquid refrigerant would back up into the condenser. If the air conditioning system reached a high pressure cut-out threshold, the air conditioner compressor clutch would disengage, causing a possible sudden increase in engine speed and vehicle ground speed.

An off-road utility vehicle air conditioning system is needed for those off-road utility vehicles having gas powered engines and non-electronically controlled CVTs. An off-road utility vehicle air conditioning system is needed for such vehicles that can provide adequate cooling over the wide range of engine speeds. An off-road utility vehicle air conditioning system is needed that does not reduce vehicle performance.

SUMMARY OF THE INVENTION

An air conditioning system for an off-road utility vehicle having a gas powered internal combustion engine under a rear cargo bed. The engine provides peak power at engine speeds of at least about 5000 rpm, and has an output shaft that rotates a variable displacement air conditioning compressor and an alternator with at least one rubber belt, and a primary clutch of a non-electronically controlled continuously variable transmission. The air conditioning unit is connected to the variable displacement air conditioning compressor, and at least a portion of the air conditioning unit is positioned within a mounting structure in front of a cab and between a pair of front wheels.

DESCRIPTION OF THE PREFERRED EMBODIMENT

Figure 1:
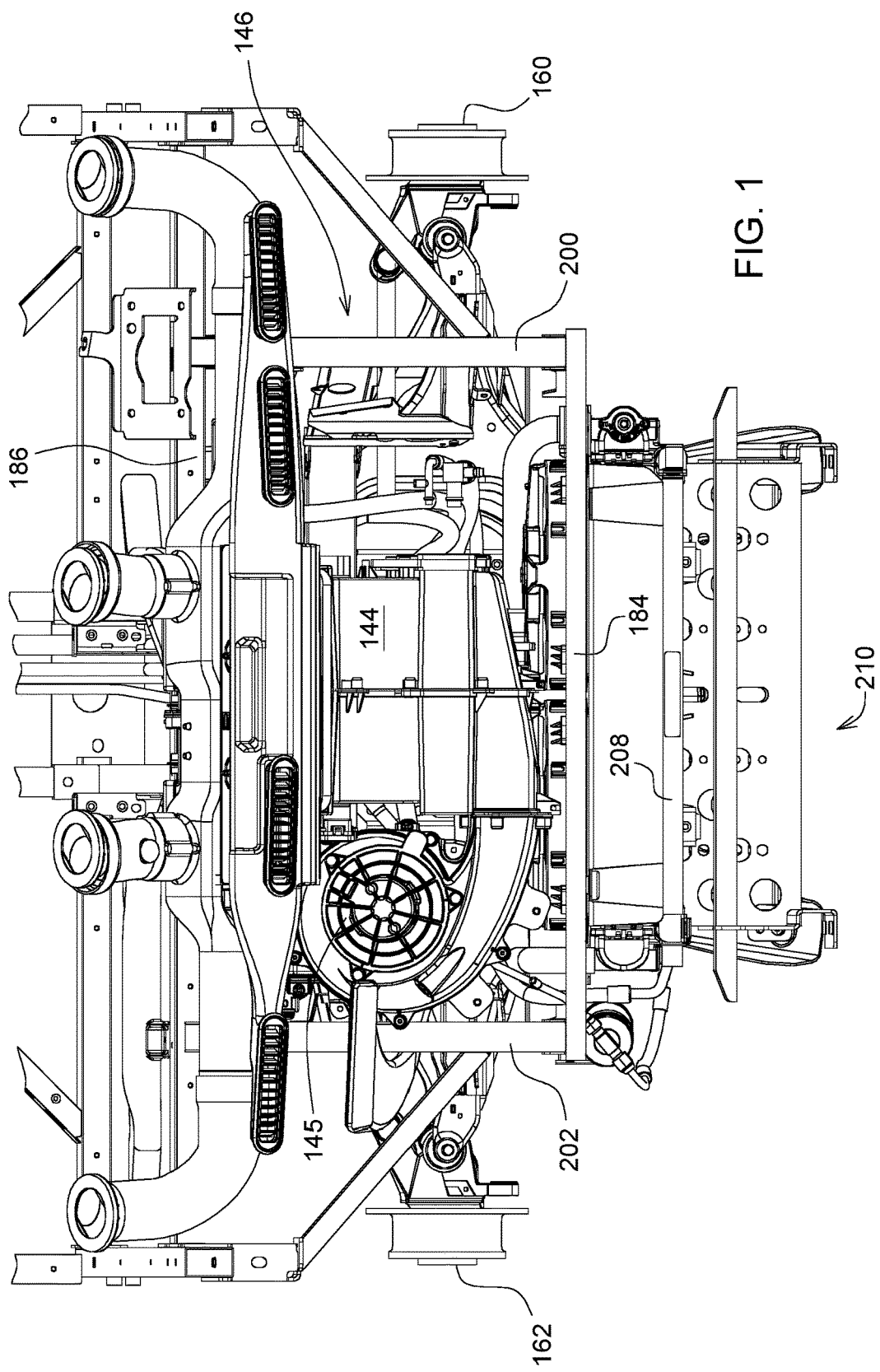
FIG. 1 is a top view of the front end of an off-road utility vehicle air conditioning system according to a first embodiment of the invention
Figure 2:
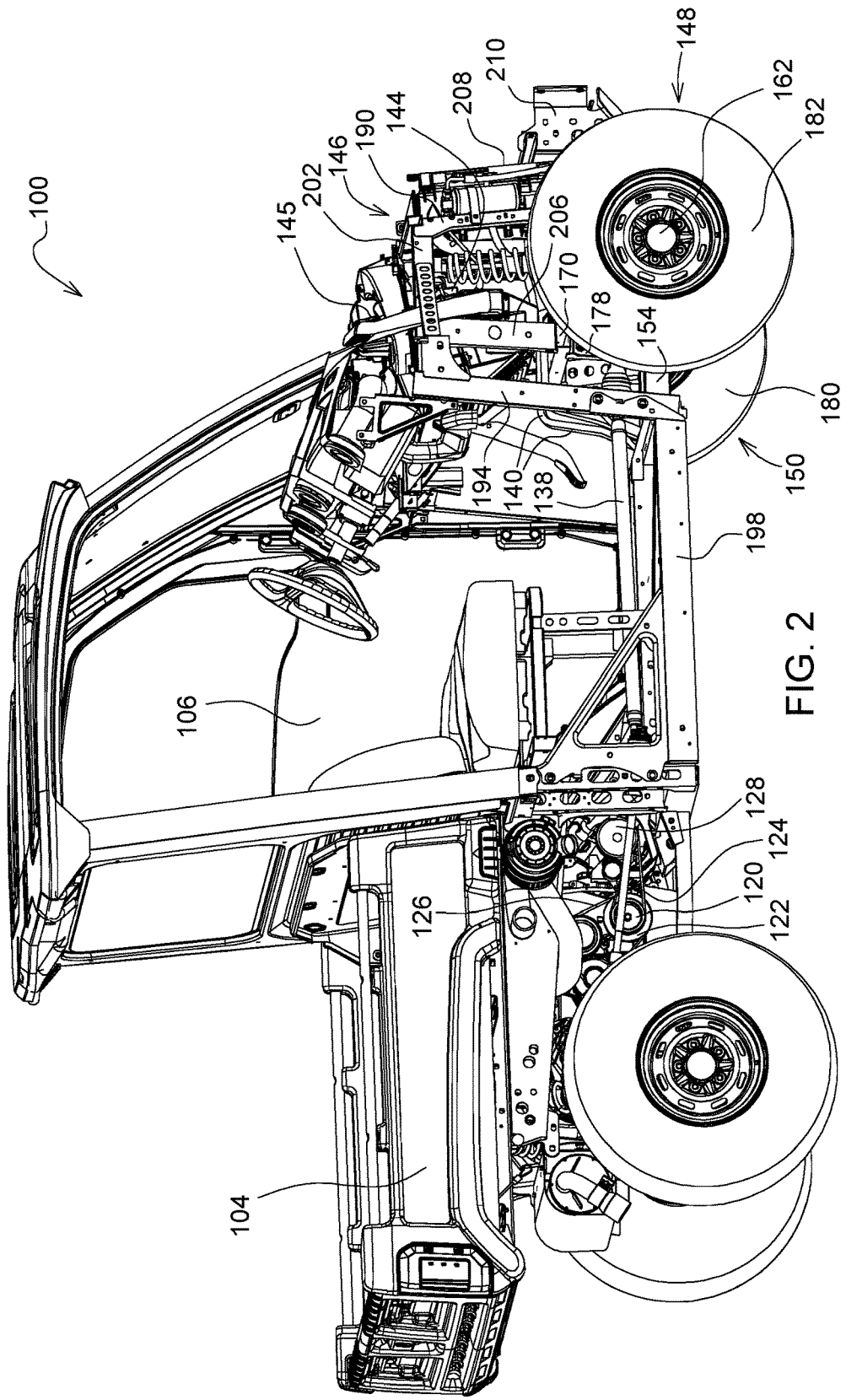
FIG. 2 is a right side perspective view, partially in cross section, of an off-road utility vehicle with an air conditioning system according to a first embodiment of the invention.
Figure 3:
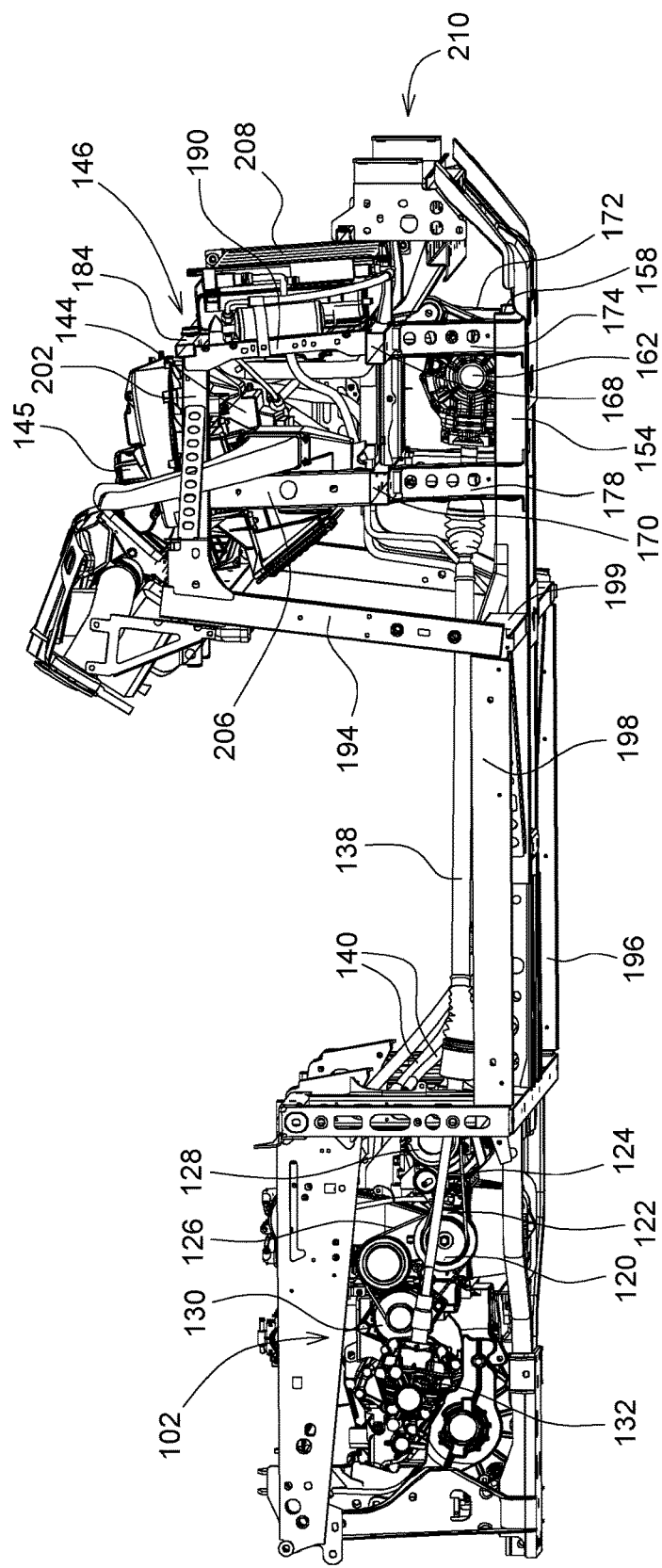
FIG. 3 is a right side perspective view of an off-road utility vehicle air conditioning system according to a first embodiment of the invention.
Figure 4:
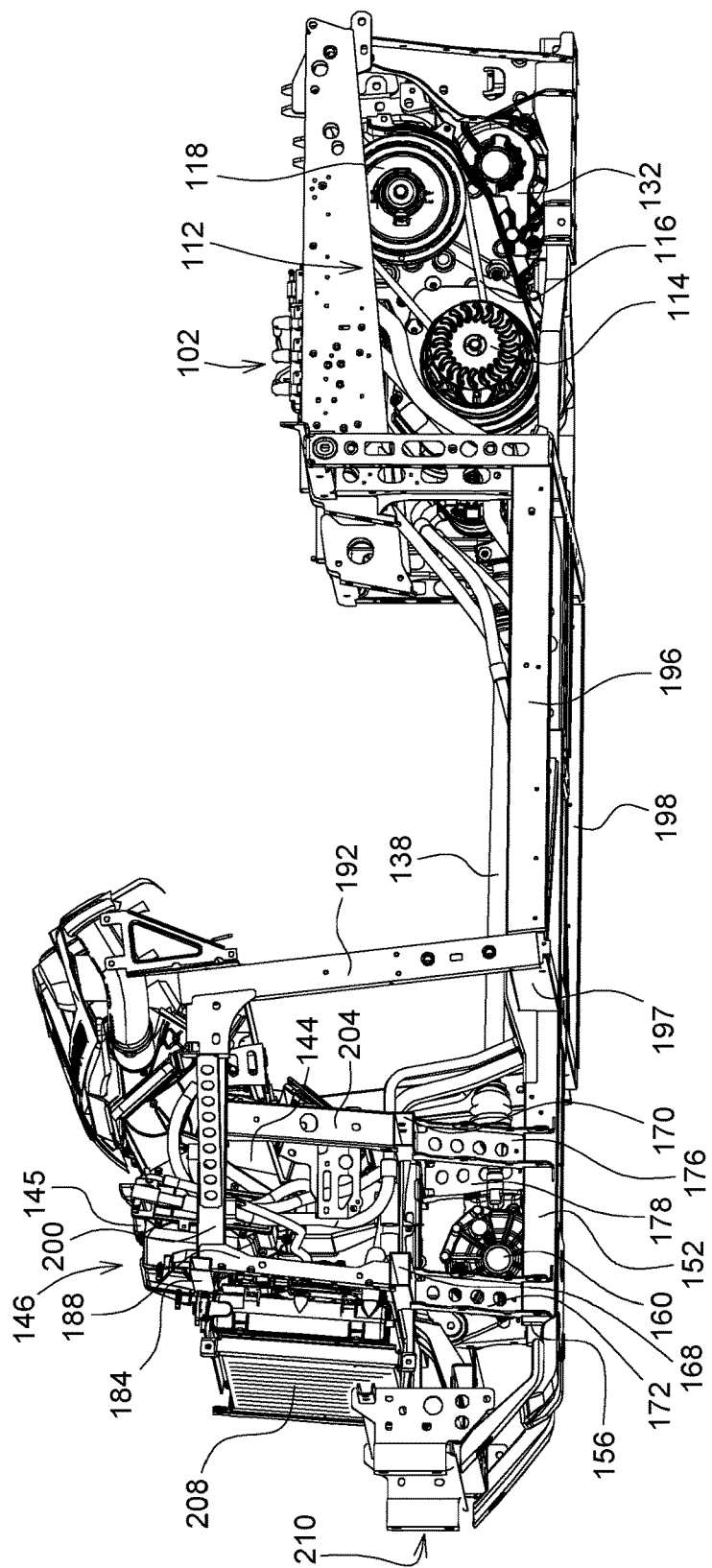
FIG. 4 is a left side perspective view of an off-road utility vehicle air conditioning system according to a first embodiment of the invention.
Figure 5:
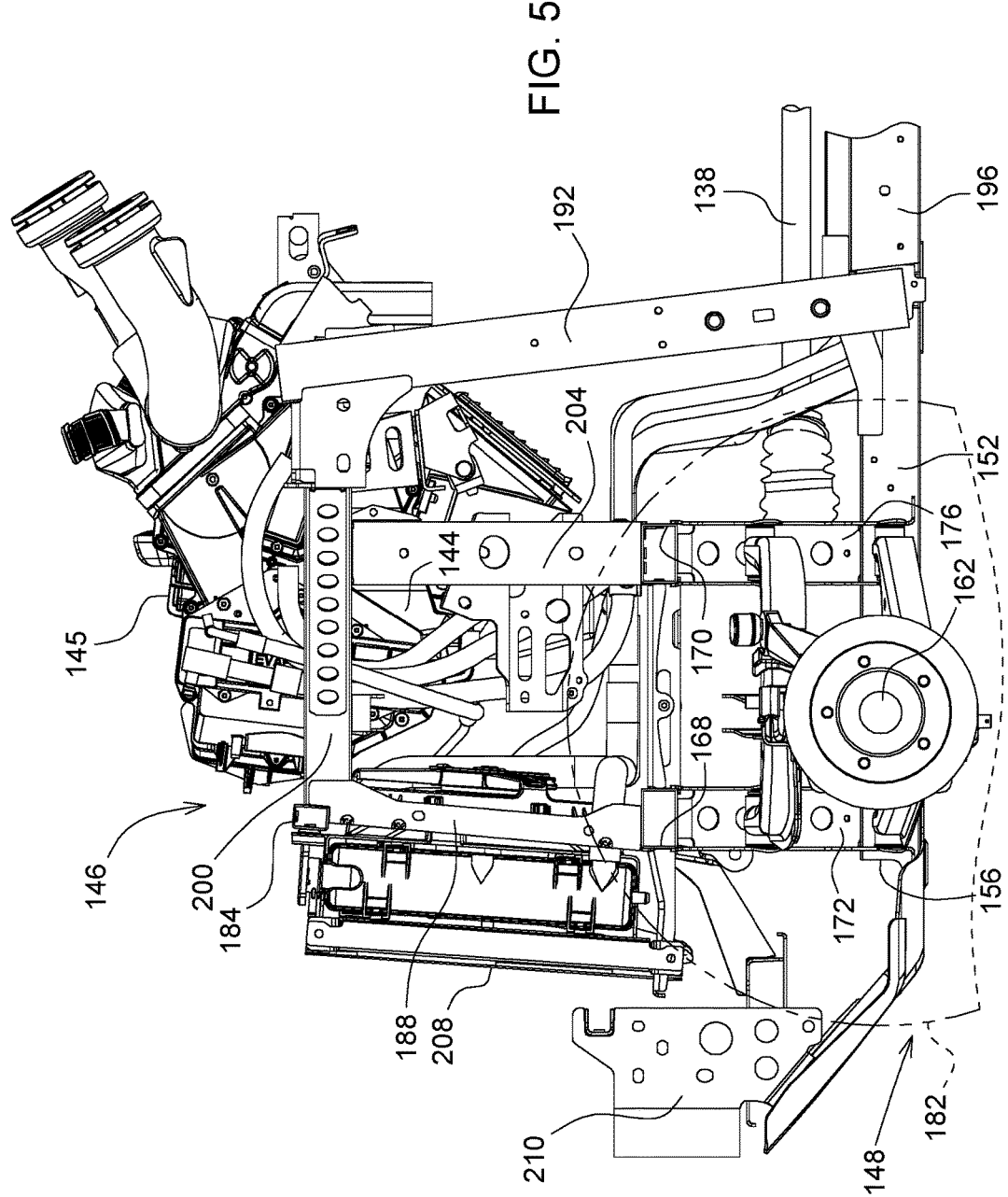
FIG. 5 is a left side view of the front end of an off-road utility vehicle air conditioning system according to a first embodiment of the invention.

In an embodiment of the off-road utility vehicle air conditioning system shown in FIGS. 1-5, off-road utility vehicle 100 has a gas powered internal combustion engine 102 mounted to the rear of the vehicle transversely to the main axis and chassis or frame of the vehicle. The transverse engine may be located under rear cargo box 104, with an output shaft extending across the vehicle. The off-road utility vehicle may have an enclosed cab 106 with a driver seat next to a passenger seat. The enclosed cabin may have a driver side door and a passenger side door, each door having a window.

In one embodiment of the off-road utility vehicle air conditioning system, off-road utility vehicle 100 may have a non-electronically controlled continuously variable transmission (CVT) 112. The CVT may include primary clutch 114 mounted to a first or left end of the engine output shaft on the left side of the engine. The primary clutch may include a stationary sheave and a movable sheave that engage rubber belt 116. The movable sheave may move toward the stationary sheave in response to flyweights that pivot further outwardly as rotational speeds increase. The rubber belt may extend rearwardly and upwardly to engage and rotate secondary clutch 118 having a stationary sheave and a movable sheave. A spring may urge the movable sheave towards the stationary sheave of the secondary clutch, and a cam or helix may urge the movable sheave closer to the stationary sheave. The CVT may be biased to allow the engine to run at peak or optimal power speed, typically over 5000 rpm. The CVT may automatically change the drive ratio and allow the engine to operate at peak or optimal power without electronic controls.

In one embodiment, off-road utility vehicle 100 may have accessory drive pulleys 120, 122 mounted to a second or right end of the engine output shaft on the right side of the engine. The accessory drive pulleys may engage rubber belts 124, 126. Rubber belt 124 may extend upwardly and forwardly to engage and rotate variable displacement air conditioning compressor 128 mounted forwardly of the transverse engine. Rubber belt 126 may extend upwardly and rearwardly to engage and rotate alternator 130 to charge a 12V battery.

In one embodiment, CVT 112 may be connected to rear transaxle 132 rearwardly of the transverse engine. MFWD drive shaft 138 may extend forwardly from the rear transaxle around the right side of the transverse engine inwardly toward a center tunnel and up to the front gear box.

In one embodiment, the off-road utility vehicle air conditioning system may include variable displacement air conditioning compressor 128 positioned forward of the engine, and rearward of the cab and seats, under the rear cargo box. Refrigerant lines 140 from the compressor may be routed forwardly under the cab through a center tunnel. The compressor may be an internally controlled variable displacement compressor (ICVDC) or externally controlled variable displacement compressor (ECVDC). The ICVDC may have a mechanical feedback control loop to sense refrigerant demand from the system by sensing compressor suction pressure. A control valve may be used to sense the suction pressure and ultimately vary the compressor displacement to maintain a set suction pressure which correlates with cab air temperature and humidity. In doing so, it allows the compressor to reduce displacement (and therefore power consumption) to match the refrigerant demand independently of engine or compressor speed. The ECVDC may function in a similar fashion, except the compressor displacement is controlled electronically rather than mechanically. The variable displacement compressor may have a lower displacement when providing cooling while the engine runs at peak power which may be at engine speeds of at least about 5000 rpm up to about 6500 rpm, a higher displacement to provide enough refrigerant to satisfy cab cooling demands at low engine speeds below about 1000 rpm which may be when the CVT is disengaged, and at any engine speed in the range between 1000 rpm and over 5000 rpm.

In one embodiment, the off-road utility vehicle air conditioning system may include air conditioning unit 144 and blower unit 145. At least a portion of the air conditioning unit and blower unit may be positioned and mounted within and inside mounting structure 146. The mounting structure for the air conditioning unit and blower unit may be a box-shaped structure having a plurality of interconnected frame tubes, the tubes having rectangular cross sections. The mounting structure may be positioned directly between front wheels 148, 150. The bottom of mounting structure 146 may be supported by lower front frame tubes 152, 154. The front end 156, 158 of each lower front frame tube may be forward of front wheel rotational axes 160, 162. Mounting structure 146 may include first and second lower cross tubes 168, 170 supported by control arm brackets 172-178 that extend upwardly and laterally outwardly from lower front frame tubes 152, 154. First lower cross tube 168 may be adjacent and perpendicular to the front ends 156, 158 of the lower front frame tubes. Second lower cross tube 170 may be behind the front wheel axles and perpendicular to the lower front frame tubes. The first and second lower cross tubes may be positioned below the top of each front tire 180, 182 and may extend laterally outwardly from control arm brackets 172-178, while still providing sufficient clearance for steering the front wheels. Mounting structure 146 may include first and second upper cross tubes 184, 186. First upper cross tube 184 may be positioned above first lower cross tube 168. Second upper cross tube 186 may be positioned above second lower cross tube 170. First upper cross tube 184 may be supported by left and right front uprights 188, 190 that extend upwardly and may be inclined rearwardly from the left and right ends of first lower cross member 168. Second upper cross tube 186 may be supported by left and right rear uprights 192, 194 that extend upwardly and may be inclined forwardly from the forward ends of cab frame side tubes 196, 198 and cross tubes 197, 199. Mounting structure 146 also may include left and right upper side tubes 200, 202 connecting between first and second upper cross tubes 184, 186. Left and right middle uprights 204, 206 may extend between the ends of second lower cross tube 170 and left and right upper side tubes 200, 202.

In one embodiment, air conditioning unit 144 and blower unit 145 may be positioned between left and right upper tubes 200, 202, and between first and second upper cross tubes 184, 186 of the mounting structure. The air conditioning unit and blower unit may be mounted using brackets to the mounting structure, so that the air conditioning unit and blower unit extend substantially below the left and right upper side tubes of the mounting structure, and substantially below the first and second upper cross tubes. Additionally, blower unit 145 may be mounted so that it inclines rearwardly and may include an electric fan having a non-vertical rotational axis.

In one embodiment, the off-road utility vehicle air conditioning system may include air conditioner condenser 208 mounted forwardly of mounting structure 146 and inclined rearwardly. The condenser may be mounted at substantially the same height as the mounting structure, and may be directly in front of the portion of the air conditioning unit within the mounting structure. The condenser may be positioned and mounted forwardly of the front ends 156, 158 of lower front frame tubes 152, 154, so the condenser is above front bumper 210, and is not above the lower front frame tubes. The width of the condenser may be substantially greater than the gap between the lower front frame tubes, but less than the gap between the left and right upper side tubes 200, 202.

In one embodiment, the off-road utility vehicle air conditioning system may include belt driven alternator 130 that charges a 12 volt battery to run air conditioning unit 144 for maximum cooling capacity with the engine at peak power. For example, the belt driven alternator may generate about 1000 Watts while the engine runs at about 5000 rpm to about 6500 rpm. The 12V battery may provide sufficient electrical power to run HVAC blower motor 145, one or more electric condenser fans, and a clutch for variable displacement compressor 128. The off-road utility vehicle may include an electronic controller that may monitor battery voltage, and shed one or more electrical loads if running the air conditioning system results in a significantly reduced voltage. For example, the controller may shed electrical loads by reducing blower fan speed, turning off one of the condenser fans, or turning off accessory lights.

Having described the preferred embodiment, it will become apparent that various modifications can be made without departing from the scope of the invention as defined in the accompanying claims.

The invention claimed is:

1. An off-road utility vehicle air conditioning system, comprising:
 a gas powered internal combustion engine under a rear cargo bed; the engine having an output shaft with a first end and a second end and a peak power at an engine speed of at least about 5000 rpm;
 a variable displacement air conditioning compressor and an alternator rotated by at least one rubber belt driven by the second end of the engine output shaft;
 a non-electronically controlled continuously variable transmission biased to run the engine at peak power with a primary clutch rotated by the first end of the engine output shaft and a rubber belt from the primary clutch to a secondary clutch; and
 an air conditioning unit connected to the variable displacement air conditioning compressor, at least a portion of the air conditioning unit positioned within a mounting structure in front of a cab and between a pair of front wheels.

2. The off-road utility vehicle air conditioning system of claim 1 further comprising an air conditioning condenser mounted forwardly of the portion of the air conditioning unit within the mounting structure.

3. The off-road utility vehicle air conditioning system of claim 1 further comprising a blower unit having an electric fan with a non-vertical rotational axis, at least a portion of the blower unit positioned within the mounting structure.

4. The off-road utility vehicle air conditioning system of claim 3 wherein the air conditioning unit and the blower unit are mounted between a left upper side tube and a right upper side tube, and between a first upper cross tube and a second upper cross tube, of the mounting structure.

5. The off-road utility vehicle air conditioning system of claim 1 wherein the secondary clutch of the non-electronically controlled continuously variable transmission drives the pair of front wheels and a pair of rear wheels.

6. An off-road utility vehicle air conditioning system, comprising:
   a gas powered internal combustion engine mounted transversely under a rear cargo box of an off-road utility vehicle, the engine transmitting power to a pair of front wheels and a pair of rear wheels through a non-electronically controlled belt driven continuously variable transmission having a primary clutch rotated by a first end of an output shaft of the engine, the continuously variable transmission biased to run the engine at a peak power speed over about 5000 rpm;
   a belt driven variable displacement air conditioning compressor and a belt driven alternator rotated by a second end of the output shaft of the engine; and
   an air conditioning unit mounted forward of a cab of the off-road utility vehicle and connected by refrigerant lines to the variable displacement air conditioning compressor, the variable displacement air conditioning compressor having a higher displacement when the non-electronically controlled belt driven continuously variable transmission is disengaged at an engine idle speed, and having a lower displacement when the non-electronically controlled belt driven continuously variable transmission is engaged and the engine is running at the peak power speed.

7. The off-road utility vehicle air conditioning system of claim 6 wherein the air conditioning unit is mounted at least partially within a mounting structure forward of the cab.

8. The off-road utility vehicle air conditioning system of claim 7 further comprising an air conditioning condenser mounted forwardly of the mounting structure.

9. The off-road utility vehicle air conditioning system of claim 7 wherein the mounting structure is positioned between a pair of front wheels and tires.

10. An off-road utility vehicle air conditioning system, comprising
    an air conditioning unit positioned at least partially inside a mounting structure in front of an enclosed cab, and between a pair of front wheels of a utility vehicle, and connected to a variable displacement air conditioning compressor driven by an output shaft on the right side of a gas powered internal combustion engine positioned behind the cab and below a rear cargo box;
    a non-electronically controlled belt driven continuously variable transmission transmitting power from an output shaft on the left side of the gas powered internal combustion engine to a pair of front wheels and a pair of rear wheels, the continuously variable transmission biased to ratios where the engine runs at over about 5000 rpm; and
    a belt-driven alternator behind the cab and below the cargo box.

11. The off-road utility vehicle air conditioning system of claim 10 further comprising an air conditioning condenser mounted directly in front of the portion of the air conditioning unit inside the mounting structure.

* * * * *